United States Patent
Fournier et al.

(10) Patent No.: US 10,184,084 B2
(45) Date of Patent: Jan. 22, 2019

(54) OILSANDS PROCESSING USING INLINE AGITATION AND AN INCLINED PLATE SEPARATOR

(71) Applicant: US OIL SANDS INC., Calgary (CA)

(72) Inventors: Joseph Fournier, Calgary (CA); Barclay Cuthbert, Calgary (CA); Tyler Lavalley, Calgary (CA); Trevor Grant Lavalley, Calgary (CA)

(73) Assignee: USO (Utah) LLC

( * ) Notice: Subject to any disclaimer, the term of this patent is extended or adjusted under 35 U.S.C. 154(b) by 599 days.

(21) Appl. No.: 14/959,910

(22) Filed: Dec. 4, 2015

(65) Prior Publication Data

US 2016/0160126 A1  Jun. 9, 2016

Related U.S. Application Data

(60) Provisional application No. 62/088,222, filed on Dec. 5, 2014.

(51) Int. Cl.
| | |
|---|---|
| *C10G 1/04* | (2006.01) |
| *B01D 43/00* | (2006.01) |
| *C10G 1/00* | (2006.01) |
| *C10G 31/10* | (2006.01) |

(52) U.S. Cl.
CPC ............. *C10G 1/045* (2013.01); *B01D 43/00* (2013.01); *C10G 1/002* (2013.01); *C10G 31/10* (2013.01)

(58) Field of Classification Search
CPC ........ C10G 1/002; C10G 1/045; C10G 31/10; B01D 43/00; B01D 21/26; B01D 21/28
See application file for complete search history.

(56) References Cited

U.S. PATENT DOCUMENTS

| | | |
|---|---|---|
| 4,722,782 A | 2/1988 | Graham et al. |
| 4,822,481 A | 4/1989 | Taylor |
| 4,946,597 A | 8/1990 | Sury |
| 4,966,685 A | 10/1990 | Hall et al. |
| 5,143,598 A | 9/1992 | Graham et al. |
| 5,169,518 A | 12/1992 | Klimpel et al. |
| 5,316,664 A | 5/1994 | Gregoli et al. |
| 5,338,368 A | 8/1994 | Fletcher et al. |
| 5,340,467 A | 8/1994 | Gregoli et al. |
| 5,453,133 A | 9/1995 | Sparks et al. |
| 5,534,136 A | 7/1996 | Rosenbloom |
| 5,634,984 A | 6/1997 | Van Slyke |
| 5,645,714 A | 6/1997 | Strand et al. |

(Continued)

FOREIGN PATENT DOCUMENTS

| | | |
|---|---|---|
| CA | 2179720 | 6/1995 |
| WO | 2000022067 | 4/2000 |
| WO | 2001039904 | 9/2001 |

*Primary Examiner* — Renee Robinson
*Assistant Examiner* — Derek N Mueller
(74) *Attorney, Agent, or Firm* — Bennett Jones LLP

(57) ABSTRACT

A method and system of separating a mixture of water, diluted bitumen and a mineral phase comprising fine solids, produced from oil-wet or carbonate-cemented oil sands ore, includes the steps of agitating the mixture to produce a micronized emulsion of the diluted bitumen in a continuous water phase such that a majority of the diluted bitumen associates with the fine solids, and passing the micronized emulsion through a separator to produce a bitumen stream enriched in bitumen and fine solids, and a water stream.

12 Claims, 1 Drawing Sheet

(56) References Cited

U.S. PATENT DOCUMENTS

| | | | |
|---|---|---|---|
| 5,681,452 A | 10/1997 | Kirkbride | |
| 5,690,811 A | 11/1997 | Davis et al. | |
| 5,723,042 A | 3/1998 | Strand et al. | |
| 5,723,423 A | 3/1998 | Van Slyke | |
| 5,746,909 A | 5/1998 | Calta | |
| 5,780,407 A | 7/1998 | Van Slyke | |
| 5,788,781 A | 8/1998 | Van Slyke | |
| 5,985,138 A | 11/1999 | Humphreys | |
| 6,004,455 A | 12/1999 | Rendall | |
| 6,007,708 A | 12/1999 | Allcock et al. | |
| 6,007,709 A | 12/1999 | Duyvesteyn et al. | |
| 6,074,549 A | 6/2000 | Bacon Cochrane et al. | |
| 6,093,689 A | 7/2000 | Vlasblom | |
| 6,110,359 A | 8/2000 | Davis et al. | |
| 6,153,017 A | 11/2000 | Ward et al. | |
| 6,207,044 B1 | 3/2001 | Brimhall | |
| 6,211,133 B1 | 3/2001 | Chesky | |
| 6,214,213 B1 | 4/2001 | Tipman et al. | |
| 6,319,395 B1 | 11/2001 | Kirkbride et al. | |
| 6,358,403 B1 | 3/2002 | Brown et al. | |
| 6,358,404 B1 | 3/2002 | Brown et al. | |
| 6,527,960 B1 | 3/2003 | Bacon et al. | |
| 6,576,145 B2 | 6/2003 | Conaway et al. | |
| 6,709,573 B2 | 3/2004 | Smith | |
| 7,438,807 B2 * | 10/2008 | Garner | B03B 5/34 208/390 |
| 8,758,601 B2 | 6/2014 | Ophus | |
| 2003/0213747 A1 | 11/2003 | Carbonell et al. | |
| 2016/0160126 A1 | 6/2016 | Fournier et al. | |
| 2017/0260456 A1 | 9/2017 | Fournier et al. | |

\* cited by examiner

OILSANDS PROCESSING USING INLINE AGITATION AND AN INCLINED PLATE SEPARATOR

FIELD OF THE INVENTION

This invention relates to processes and systems for the treatment of product streams which result from oil sands processing operations.

BACKGROUND OF THE INVENTION

Oil sands ore, known as bituminous sands, comprises a naturally occurring mixture of sand, clay, water and bitumen. Oil sands ore may vary in quality and character from region to region, or deposit to deposit. Generally, Athabasca oil sands in Canada comprises water-wet sand grains, while Utah oil sands in the United States comprises oil-wet sand grains. The sand grains themselves may be of different composition.

Oil sand extraction processes are used to liberate and separate bitumen from oil sand ore such that the bitumen can be further processed to produce synthetic crude oil. Numerous oil sands mining and bitumen extraction processes have been developed and commercialized, all of which involve the use of water as a processing medium. One such water extraction process is the Clark hot water extraction process (the "Clark Process"), which was the first commercially successful oil sand extraction processes.

A water extraction process such as the Clark Process typically requires that mined oil sand be conditioned for extraction by being crushed to a desired lump size and then combined with caustic water to form a conditioned slurry of bitumen, water and minerals (sand and fine particles). In the Clark Process, the water used is heated to about 65 to 80° Celsius, and an amount of sodium hydroxide (caustic) is added to the slurry to adjust the slurry pH upwards, which enhances the separation of bitumen from the oil sand. Other water extraction processes may have other temperature requirements and may include other conditioning agents which are added to the oil sand slurry.

A bitumen extraction process will typically result in the production of a number of product streams, some of which are disposed of as waste. For example, in the Clark Process, these streams include a bitumen froth stream comprising of bitumen, sand, fine particulate mineral solids and water, a middlings stream comprising bitumen, fine particulate mineral solids and water, and a coarse tailings stream consisting primarily of coarse particulate mineral solids and water. The bitumen froth stream and the middlings stream are typically processed further, both to recover and purify bitumen and to render the fine solids more readily disposable and make them less of an environmental hazard. The coarse tailings stream is not typically processed further, since the coarse particulate solids are relatively easy to dispose of and do not typically present a significant environmental risk.

The bitumen froth stream is processed in a froth treatment process to separate water and fine grain size solids from the bitumen. The fine solids and water recovered from the bitumen froth stream are typically ultimately disposed of in tailings ponds, where long-term settling of the fine solids may take place and the water recovered and reused. Tailings management remains a significant environmental issue and processes which minimize tailings may be advantageous.

There remains a need for more efficiently separating bitumen and solids in an oilsand processing operation. There may be advantages in exploiting certain characteristics of different oil sands ores in order to more efficiently treat the ore to extract bitumen.

SUMMARY OF THE INVENTION

In one aspect, the invention may comprise a method of separating a mixture of water, diluted bitumen and a mineral phase comprising fine solids, wherein the mixture is produced from oil-wet or carbonate-cemented oil sands ore, comprising the following steps:
  (a) agitating the mixture to produce a micronized emulsion of the diluted bitumen in a continuous water phase such that a majority of the diluted bitumen associates with the fine solids; and
  (b) passing the micronized emulsion through a separator to produce a bitumen stream enriched in bitumen and fine solids, and a water stream.

In one embodiment, the separator is an inclined plate separator (IPS), In one embodiment, the micronized emulsion is produced in an in-line agitator comprising a pipe defining a plurality of openings.

In one embodiment, the water stream is passed through an oil-water separator to recover any remaining bitumen in the water stream.

In one embodiment, the bitumen stream is treated to produce a substantially pure diluted bitumen stream, and separate mineral and water streams.

In another aspect, the invention may comprise a system for treating a mixture of water, diluted bitumen and fine solids, wherein the mixture is produced from oil-wet or carbonate-cemented oil sands ore, to produce a bitumen enriched stream, comprising:
  (a) an agitator for agitating the mixture to produce a micronized emulsion of the diluted bitumen in a continuous water phase; and
  (b) a separator for producing a bitumen stream enriched in bitumen and fine solids, and a water stream.

In one embodiment, the agitator is an in-line mixer and/or the separator is an inclined plate separator.

BRIEF DESCRIPTION OF THE DRAWINGS

In the drawings, like elements are assigned like reference numerals. The drawings are not to scale, with the emphasis instead placed upon the principles of the present invention. Additionally, each of the embodiments depicted are but one of a number of possible arrangements utilizing the fundamental concepts of the present invention. The drawings are briefly described as follows.

DETAILED DESCRIPTION OF PREFERRED EMBODIMENTS

Figure 1:
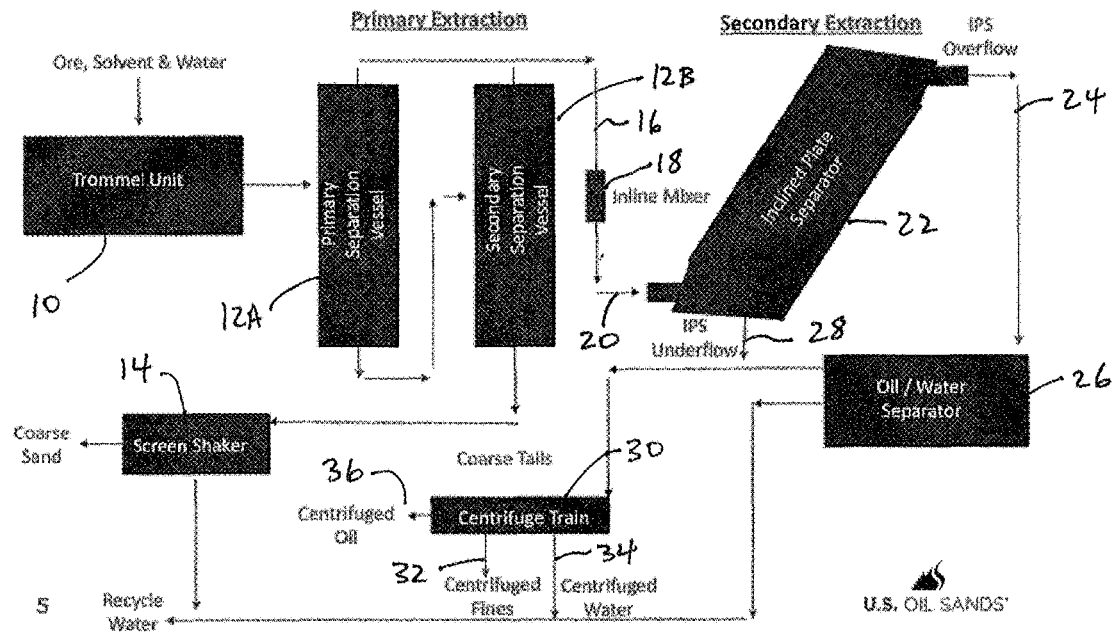
FIG. 1 shows a schematic depiction of the process flow of one embodiment of the present invention.

The present invention relates to processes and apparatus for the treatment of product streams from mineral processing operations. The present invention is particularly suited to the treatment of a diluted bitumen from such processes, which is comprised of diluted bitumen, water and a mineral phase comprising fine solids.

In one aspect, the invention comprises a method of separating diluted bitumen from water and solids, by using a separator to produce a product stream which has reduced water content, and eventually produce bitumen which is substantially free of solids and water. While separators such as inclined plate separators are well known in the oil industry, the method of the present invention is counter-intuitive, in that the diluted bitumen is recovered with the mineral phase, in a stream which is denser than water.

As used herein, "substantially pure" or "substantially free of" means that the composition comprises no more than about 1.0% by weight, preferably less than about 0.5% of other substances. The term "fungible bitumen" is defined as a diluted bitumen product wherein the sum of water and solids content is less than about 0.5 wt % to allow the bitumen product to be able to be shipped in a pipeline to a conventional refinery.

In one embodiment, the oil sands are mined or produced conventionally, and initially processed by contacting the ore with a solvent, such as a bio solvent, and water and creating a slurry of diluted bitumen, water and mineral. The general steps of one embodiment are described in co-owned U.S. Pat. No. 8,758,601, the entire contents of which are incorporated herein by reference, where permitted. This slurry mixture first passes through a rotating screen or trommel, which allows fine solids and liquid to pass through, while coarser solids are retained on the screen. This fine solids and liquid mixture is then further separated in a primary separation vessel or PSV, where gravity separation of any remaining coarse solids takes place. The overflow from the PSV, which comprises diluted bitumen, water and fine solids, is then directed to an agitator.

Typically, in one embodiment, the PSV overflow may comprise approximately 90% water by volume, with the balance roughly equally split between diluted bitumen and solids. In the present invention, this stream is agitated or sheared to produce a very fine emulsion of the diluted bitumen in water. Without restriction to a theory, it is believed that the diluted bitumen associates with the solids during the shear agitation step, possibly via calcium or other higher valence cations presented by carbonate minerals present in the solids, forming a hydrocarbon-mineral complex. As such, this method may be particularly suitable for use with carbonate cemented oil sands, or oil-wet oil sands, such as those found in Utah, New Mexico or California, The specific gravity of hydrocarbon-mineral complexes is sufficiently high to cause those complexes to settle and be removed via the underflow of a separator.

It is believed that a large proportion of the fine solids migrate to the oil/water interface of the emulsion during the agitation step. The solids are typically less than about 75 μm in diameter on average, and may be less than about 45 μm in diameter, on average. Some fine solid particles, particularly much smaller particles, may remain suspended in the water phase or in the oil phase.

In one embodiment, the agitation comprises a shearing action to micronize the oil-in-water emulsion. As used herein, a "micronized emulsion" of the diluted bitumen is an emulsified into sufficiently small and disperse droplets such that a majority of the bitumen, preferably greater than about 80%, and more preferably greater than about 90% associates with the mineral phase, and separates from the water phase. In one embodiment, a "micronized emulsion" may be such that the oil phase droplets are, on average, less than about 100 μm, preferably less than about 50 μm, and more preferably less than about 30 μm. In one preferred embodiment, a majority of the oil droplets may be in the range of about 10 μm.

The agitator may comprise any apparatus capable of mixing the PSV overflow to produce the desired micronized emulsion, such as a blender, jet agitator, or the like. In one embodiment, the agitator may comprise an inline mixer comprising of a pipe defining a plurality of openings, such as a slotted pipe, through which the PSV overflow is forced through under pressure. As a result, the overflow stream passes through the openings with sufficient velocity to induce a shearing action within the fluid. For example, a fluid velocity of about 10 ft/sec through a ¼" hole has been found to be suitable to create the desired agitation and shearing effect. In alternative embodiments, other suitable methods of mixing the mixture to produce the micronized emulsion may be used.

This micronized emulsion is then directed to a separator where a volumetric reduction of water content occurs to produce a bitumen stream enriched in diluted bitumen and fine solids, and a water stream. In one embodiment, the separator may comprise a settling tank and the bitumen stream is removed from the bottom of the tank. However, unassisted sedimentation in a settling tank may take too long. In another embodiment, the separator may comprise a centrifugal gravity separator, such as a cyclone. A cyclone may apply enough gravitational force to separate the diluted bitumen from the fine solids, which would not be desirable at this stage. Therefore, in one preferred embodiment, the micronized emulsion is treated in an inclined plate separator or IPS to produce the bitumen stream in the IPS underflow, and the water stream in the IPS overflow. Inclined plate separators may also be known as lamella clarifiers or inclined-plate clarifiers, and are well known and commercially available in suitable configurations. An IPS does not rely on increased gravitational force, but rather the large surface area of the settling plates to cause the bitumen and fine solids to be concentrated in the bitumen stream in the IPS underflow. The configuration of the IPS may be selected to vary the angle of the plates and residence time, amongst other variables. In one embodiment, a volumetric feed factor of about 0.75 US gallons per square foot is used. The density of the underflow may be measured and varied by altering the speed at which the underflow is pumped out of the IPS unit.

A substantial portion of the diluted bitumen will be in the bitumen stream, in the IPS underflow, which will then comprise less water on both a volume % and flow rate basis than the overflow from the PSV. For example, if the PSV overflow comprises about 90% water (vol.), then the IPS underflow may comprise about 60 to 70% water, while the IPS overflow may comprise 98 to 99% water.

The IPS underflow is then sent to a centrifuge train, which produces separate solids, water and diluted bitumen streams. As a result of the combination of the agitator and the separator, the total volume input into the centrifuge train is significantly reduced, which may increase the capital and operating efficiency of the process, The water stream or IPS overflow may still comprise some diluted bitumen, in the range of about 1%, which may then be separated by conventional means, such as a oil/water separator (OWS). The diluted bitumen will separate and follow the top stream from the OWS, which may then be combined with IPS underflow and sent to the centrifuge train.

An exemplary oil sand extraction process includes a first step of mining (not shown) in which oil sand is mined from an oil sand deposit. The second step is a crushing step (not shown) in which the mined oil sand is crushed into lumps of a desired size, The third step (not shown) is a solvent mixing step, where solvent is mixed with water and the oil sand and, as shown in FIG. 1, the resulting slurry mixture is passed through a rotating screen (10) or trommel to physically separate larger solids (rejects). The mixture is then processed in a primary extraction step which may involve at least one primary separation vessel or PSV (12A) and a optionally a secondary separation vessel or SSV (12B). The PSV (12) and SSV (12B) further separate coarser grained solids which are quickly and easily separated. These solids are dewatered on a sand shaker screen (14). The overflow (16) from the PSV (12) comprises bitumen diluted with the solvent, water, and remaining entrained fine solids.

Figure 2:
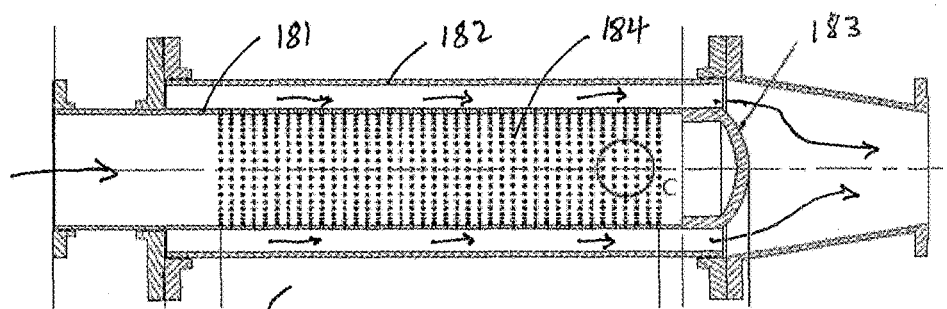
FIG. 2 shows a cross-sectional view of a preferred embodiment of an agitator comprising an in-line mixer.

The diluted bitumen, water and fine solids mixture (16) is then agitated in an agitator (18), which shears the liquid to create a micronized emulsion of the diluted bitumen in water. In one embodiment, the agitator comprises an in-line mixer as shown in FIG. 2. An inlet pipe (181) is disposed within a larger manifold (182) pipe. The inlet pipe (181) is capped with an endcap (183) and defines a plurality of small openings (184). The PSV overflow is pumped into the inlet pipe at a high pressure and thus exits the openings (184) at a high velocity, creating the micronized emulsion in the manifold pipe (182). Preferably, the total area of the openings is less than the cross-sectional area of the inlet pipe. In one embodiment, the inlet pipe (181) has an inside diameter of about 10⅞", and defines 1600 circular openings each having a diameter of ¼".

This micronized emulsion (20) is then processed in an inclined plate separator (22), which is conventionally operated to produce an underflow and an overflow. The IPS overflow (24) is predominantly water, which may optionally be processed in an oil-water separator (26) to remove any small amounts of diluted bitumen remaining. The IPS underflow (28) comprises the diluted bitumen and fine solids. Although the specific gravity of the diluted bitumen phase is less than 1.0, its association with the mineral phase drags it into the underflow (28).

The IPS underflow (28) is then processed, such as with a centrifuge train (30), which is conventionally operated to produce a diluted bitumen stream, solids stream (32) and a water stream (34). The diluted bitumen (36) recovered may be substantially free of both water and solids. In one embodiment, it is fungible grade bitumen.

Definitions and Interpretation

References in the specification to "one embodiment", "an embodiment", etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to combine, affect or connect such aspect, feature, structure, or characteristic with other embodiments, whether or not such connection or combination is explicitly described. In other words, any element or feature may be combined with any other element or feature in different embodiments, unless there is an obvious or inherent incompatibility between the two, or it is specifically excluded.

The term "and/or" means any one of the items, any combination of the items, or all of the items with which this term is associated. The phrase "one or more" is readily understood by one of skill in the art, particularly when read in context of its usage.

As used herein, a "majority" of a substance means a proportion greater than about 50% of the substance present in a mixture, as measured either by mass or volume.

The term "about" can refer to a variation of ±5%, ±10%, ±20%, or ±25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values and ranges proximate to the recited range that are equivalent in terms of the functionality of the composition, or the embodiment. As will be understood by the skilled artisan, all numbers, including those expressing quantities of reagents or ingredients, properties such as molecular weight, reaction conditions, and so forth, are approximations and are understood as being optionally modified in all instances by the term "about." These values can vary depending upon the desired properties sought to be obtained by those skilled in the art utilizing the teachings of the descriptions herein. It is also understood that such values inherently contain variability necessarily resulting from the standard deviations found in their respective testing measurements.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range (e.g., weight percents or carbon groups) includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc.

As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio. Accordingly, specific values recited for radicals, substituents, and ranges, are for illustration only; they do not exclude other defined values or other values within defined ranges for radicals and substituents.

What is claimed is:

1. A method of separating a mixture of water, diluted bitumen and a mineral phase comprising fine solids, wherein the mixture is produced from oil-wet or carbonate-cemented oil sands ore, comprising the following steps:
   (a) agitating the mixture to produce a micronized emulsion of the diluted bitumen in a continuous water phase such that a majority of the diluted bitumen associates with the fine solids; and
   (b) passing the micronized emulsion through a separator to produce a bitumen stream enriched in bitumen and fine solids, and a water stream, wherein the micronized emulsion is produced in an in-line agitator comprising a pipe defining a plurality of openings, by passing the mixture through the openings under pressure sufficient to shear the bitumen into micronized droplets.

2. The method of claim 1 wherein the separator is an inclined plate separator (IPS) and wherein the water stream comprises an IPS overflow and the enriched bitumen stream comprises an IPS underflow.

3. The method of claim 1 wherein the fine solids comprise particles having an average particle size of about 75 um or less.

4. The method of claim 2 wherein greater than about 80% or about 90% of the bitumen associates with fine solids and is recovered in the IPS underflow.

5. The method of claim 1 wherein the water stream is passed through an oil-water separator to recover any remaining bitumen.

6. The method of claim 1 wherein the bitumen stream is further treated to produce a substantially pure diluted bitumen stream.

7. The method of claim 6 wherein the bitumen stream is further treated in a three phase separating centrifuge.

8. The method of claim 1 wherein the water stream from the separator is substantially free of bitumen and solids.

9. The method of claim 1 wherein the pressure is sufficient to create fluid velocity of about 10 ft/s as the mixture passes through an opening of about ¼" in diameter.

10. The method of claim 1 wherein the micronized emulsion comprises diluted bitumen droplets having at least one dimension less than about 50 microns.

11. A system for treating a mixture of water, diluted bitumen and fine solids, wherein the mixture is produced from oil-wet or carbonate-cemented oil sands ore, to produce a bitumen enriched stream, comprising:
 (a) an agitator for agitating the mixture to produce a micronized emulsion of the diluted bitumen in a continuous water phase; and
 (b) a separator for producing a bitumen stream enriched in bitumen and fine solids, and a water stream,
 wherein the agitator is an in-line mixer comprising an inlet pipe disposed within a manifold pipe, wherein the inlet pipe difines a plurity of openings, wherein the total area of the openings is smaller than the cross-sectional area of the inlet pipe.

12. The system of claim 11 wherein the separator is an inclined plate separator.

\* \* \* \* \*